(No Model.)
F. W. LUSCOMB & D. A. COREY.
DRILLING MACHINE.
No. 410,762. Patented Sept. 10, 1889.
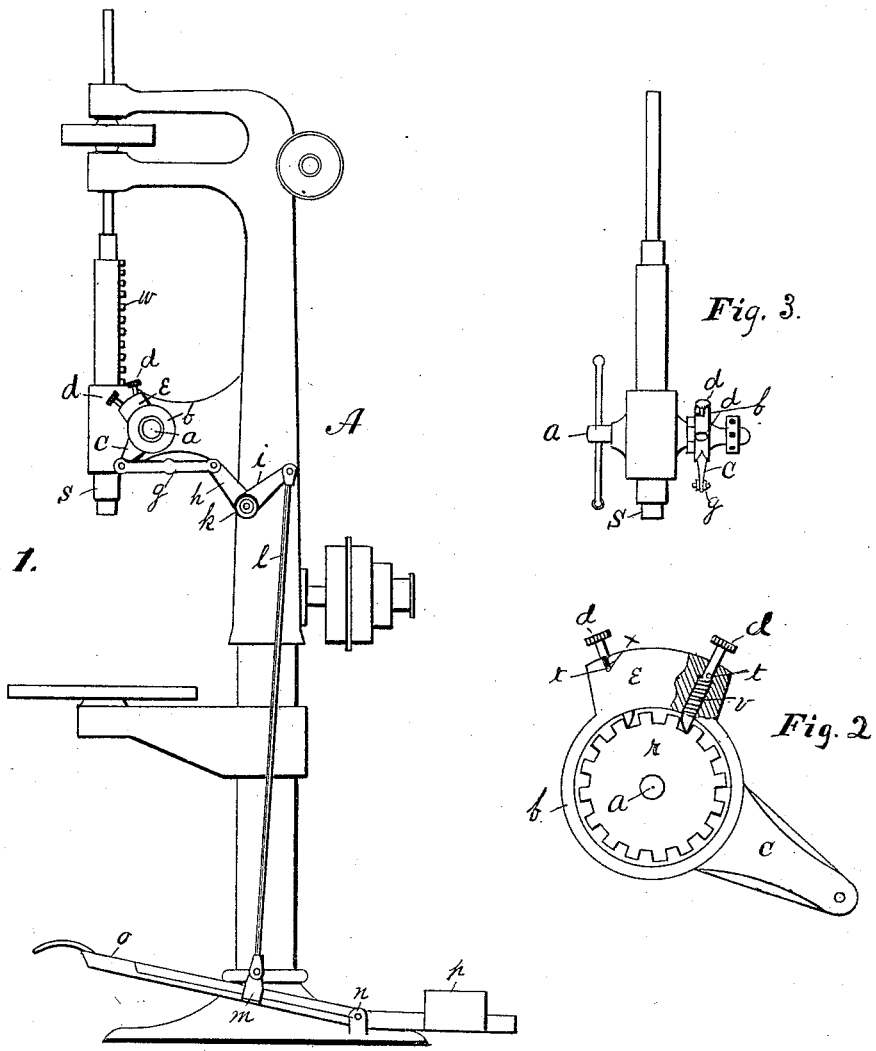
Witnesses
Fred A. Mason
C. O. Mason
Inventors
Frederick W. Luscomb
David A. Corey
by F. W. Mason atty.

UNITED STATES PATENT OFFICE.

FREDERICK W. LUSCOMB AND DAVID A. COREY, OF NEW BEDFORD, MASSACHUSETTS.

DRILLING-MACHINE.

SPECIFICATION forming part of Letters Patent No. 410,762, dated September 10, 1889.

Application filed July 3, 1889. Serial No. 316,448. (No model.)

*To all whom it may concern:*

Be it known that we, FREDERICK W. LUSCOMB and DAVID A. COREY, citizens of the United States, residing at New Bedford, in the county of Bristol and State of Massachusetts, have invented certain new and useful Improvements in Drilling-Machines, of which the following is a specification.

Our invention relates to drilling-machines; and its object is to provide means whereby the drill may be fed to or removed from the work by means of the operator's foot, and thus leave both of his hands free to hold and manage his work; and it consists in providing the shaft of the feed-pinion of a drilling-machine with a toothed wheel rigidly fixed to said shaft and provided with a housing pivoted on said shaft, having two spring-detents to engage with said toothed wheel at the will of the operator, and having a projecting arm and means to connect the same with a foot-lever, whereby the said toothed wheel, shaft, and feed-pinion may be rotated by depressing said foot-lever.

In the accompanying drawings, Figure 1 is a side elevation of a drilling-machine provided with our invention. Fig. 2 is a view of the toothed wheel within its housing, which is provided with spring-detents and a projecting arm. Fig. 3 is a front view of a portion of the spindle of the drilling-machine and the bracket which carries it.

In the drawings, A represents an upright drilling-machine of ordinary construction with the exception of our improvement.

$a$ is the shaft, on which is mounted the ordinary feed-pinion, which engages the rack $w$ on the spindle $s$.

$b$ is the housing, which incloses the toothed wheel which we supply to the shaft $a$ and which is pivoted on said shaft. $e$ is an extension of said housing, in which are located the spring-detents $d$ $d$.

$c$ is an arm projecting from the housing $b$ in the same plane thereof, and which is connected with the arm $h$ by the bar $g$. The arms $h$ and $i$ project from the same sleeve at right angles to each other, and the sleeve is pivoted on the shaft $k$, which projects from the frame of the drilling-machine. To the end of the arm $i$ is pivoted the rod $l$, whose lower end is pivoted to the adjustable block $m$. The foot-lever $o$ is pivoted between the standards $n$, and is provided with the weight $p$, which is adjustable on said lever.

The arrangement of the toothed wheel within the housing $b$, together with the construction and operation of the different parts, is fully shown in Fig. 2, in which $r$ is the toothed wheel, made fast to the shaft $a$.

$d$ $d$ are the spring-detents, having chisel-shaped points taking into the teeth of the wheel $r$. The detents $d$ $d$ are provided with the pins $t$ $t$, which, when the detents engage the wheel $r$, drop into the slots $x$ by means of the springs $v$ $v$.

The operation of the device is as follows: When it is desired to drill a number of short holes, both detents are allowed to engage with the toothed wheel $r$, which causes the motion of the spindle $s$ to be coincident with that of the foot-lever $o$, thus enabling the operator to feed the drill to and remove it from the work by means of the foot-lever, while both his hands are at liberty to hold and manage his work. When it is desired to drill a hole deeper than the extent of one stroke of the foot-lever, the rear detent is disengaged from the toothed wheel $r$ and turned so that the pin $t$ will rest on the top of the extension $e$ and there be held in place. The foot-lever $o$ is then depressed to the limit of its stroke, thus feeding the drill that distance into the work. The foot-lever is then allowed to rise, and while it is so doing the chisel-shaped point of the detent allows it to slip over the teeth of the wheel $r$ until, when the lever is moved in the opposite direction, the point catches and the spindle $s$ and drill are moved coincidently with the foot-lever.

What we claim is—

In combination with the feed-pinion and shaft of a drilling-machine, a toothed wheel rigidly mounted on said shaft and having a housing pivoted on said shaft, and provided with two spring-detents to engage with said toothed wheel at the will of the operator, and having a projecting arm connected by suitable mechanism with a foot-lever, whereby the spindle of the drilling-machine is fed toward or from the work by the foot of the operator.

FREDERICK W. LUSCOMB.
DAVID A. COREY.

Witnesses:
H. W. MASON,
J. L. GILLINGHAM.